(12) United States Patent
Wendler

(10) Patent No.: US 7,249,504 B1
(45) Date of Patent: Jul. 31, 2007

(54) LEVEL METER

(75) Inventor: Armin Wendler, Freiburg i. Br. (DE)

(73) Assignee: Endress + Hauser GmbH + Co, KG, Maulburg (DE)

( * ) Notice: Subject to any disclaimer, the term of this patent is extended or adjusted under 35 U.S.C. 154(b) by 0 days.

(21) Appl. No.: 10/181,927

(22) PCT Filed: Nov. 24, 2000

(86) PCT No.: PCT/EP00/11726

§ 371 (c)(1),
(2), (4) Date: Dec. 18, 2002

(87) PCT Pub. No.: WO01/55683

PCT Pub. Date: Aug. 2, 2001

(30) Foreign Application Priority Data

Jan. 29, 2000 (DE) ................. 100 03 941

(51) Int. Cl.
*G01F 23/00* (2006.01)
*G01D 21/00* (2006.01)
(52) U.S. Cl. ................... 73/290 V; 73/866.5
(58) Field of Classification Search .......... 73/290 R, 73/290 V, 304 R, 866.5; 174/65 R
See application file for complete search history.

(56) References Cited

U.S. PATENT DOCUMENTS

| | | | | |
|---|---|---|---|---|
| 5,272,921 A * | 12/1993 | Foller et al. | ............. | 73/304 R |
| 5,279,156 A * | 1/1994 | van der Pol | ............. | 73/290 V |
| 5,391,839 A * | 2/1995 | Lang et al. | ............. | 174/65 R |
| 5,827,985 A * | 10/1998 | Grieger et al. | ............. | 73/866.5 |
| 6,386,055 B1 * | 5/2002 | Eason | ............. | 73/866.5 |
| 6,393,909 B1 * | 5/2002 | Fahrenbach et al. | ...... | 73/290 V |
| 6,619,117 B1 * | 9/2003 | Reimelt | ............. | 73/290 R |
| 6,642,807 B1 * | 11/2003 | Gard | ............. | 333/24 R |
| 6,715,345 B2 * | 4/2004 | Ookubo et al. | ............. | 73/105 |
| 6,750,657 B2 * | 6/2004 | Griessbaum et al. | ........ | 324/642 |
| 6,820,510 B2 * | 11/2004 | Schroth et al. | ............. | 73/866.5 |

FOREIGN PATENT DOCUMENTS

| | | | |
|---|---|---|---|
| DE | 2744864 A1 * | 4/1979 | |
| DE | 3214487 A1 * | 10/1983 | |
| EP | 0875738 A1 * | 1/1982 | |
| EP | 0780664 A2 | 6/1997 | |
| EP | 0780665 A2 | 6/1997 | |

(Continued)

*Primary Examiner*—Hezron Williams
*Assistant Examiner*—John Fitzgerald
(74) *Attorney, Agent, or Firm*—Bacon & Thomas, PLLC

(57) ABSTRACT

The invention relates to a level meter for metering the level of a filling substance in a container by means of electromagnetic signals that are guided into and out of the container along a waveguide. The inventive level meter guarantees a high tightness even at large temperature variations at the point of measurement or under great pressure or tensile forces acting upon the waveguide. The inventive level meter comprises at least one waveguide that projects into the container, guides the signals into the container and guides the signals reflected by the surface of the filing substance out of the container and is fixed in a housing mounted on the container. An elastic molded element that is clamped parallel to a longitudinal axis of the waveguide sealingly rests against the housing and the waveguide and adjoins a recess that encloses the waveguide.

6 Claims, 4 Drawing Sheets

FOREIGN PATENT DOCUMENTS

| | | |
|---|---|---|
| EP | 0875738 A1 | 11/1998 |
| EP | 0928955 A2 | 7/1999 |
| GB | 2079950 A * | 1/1982 |
| WO | WO 9825109 A2 * | 6/1998 |
| WO | WO 0192835 A1 * | 12/2001 |
| WO | WO 0242793 A * | 5/2002 |

* cited by examiner

LEVEL METER

TECHNICAL FIELD

The invention relates to a level meter for measuring a level of a product in a container by means of electromagnetic signals. The signals are transmitted to at least one waveguide protruding into the container. This waveguide carries the signals into the container, and carries signals reflected from a product surface out again. A transit time of the electromagnetic signals can be determined, for instance, and from that the level can be ascertained.

BACKGROUND OF THE INVENTION

As the waveguide, either a single waveguide or two or more parallel waveguides can be used, which extend downward into the container from a point above the highest level to be measured. Bare metal wires, also known as Sommerfeld waveguides, are suitable for instance as the waveguides, or else metal wires provided with an insulation. The latter are also known as Goubau waveguides.

An electronic circuit for generating electromagnetic signals, and a reception and evaluation circuit for determining a fill level, are described for instance in European Patent Disclosure EP-A 780 665.

Level meters that employ electromagnetic signals can be used in many applications, both in the field of storage and in the processing industry, such as in chemistry, the foods industry, and the oil industry.

The level meter is exposed to often great temperature fluctuations, and strong tension or compression forces can act on the waveguide. There are many applications in which despite these adverse conditions, the product absolutely must be prevented from being able to escape through the meter.

In European Patent Disclosure EP-A 928 955, a level meter for measuring a level of a product in a container by means of electromagnetic signals is described which includes:

at least one waveguide protruding into the container,
which carries the signals into the container and carries signals reflected from a product surface back out, and
which is secured in a housing that can be mounted on the container.

In the housing, inserts of a dielectric, such as a thermoplastic, a pressure-setting plastic, an elastomer, a ceramic, polyetherimide (PEI), polytetrafluoroethylene (PTFE), polyphenyl sulfide (PPS), or polycarbonates are provided, by which the waveguide is secured in the container. The housing, waveguide and inserts have conical jacket faces, which are disposed relative to one another such that they prevent a motion of the inserts and of the waveguide into the container. On a side remote from the container, the housing is closed off by a metal insert, by which a motion of the waveguide and inserts in the direction remote from the container is prevented. Spring elements are provided, by which the metal insert is pressed in the direction toward the container, and the inserts with the waveguide wedged into them are pressed in the direction away from the container.

For sealing purposes, in one exemplary embodiment, O-rings are provided, which are disposed in grooves between the housing and one of the inserts and between that insert and the waveguide.

Because of the fastening by means of springs, the insert, waveguide and housing can move slightly relative to one another. This can adversely affect the sealing action.

The waveguide, insert and housing form a coaxial cable in which the electromagnetic signals are carried. The grooves and O-ring represent discontinuities at which the impedance of the coaxial cable changes abruptly. Such abrupt changes in impedance cause reflection of a portion of the electromagnetic signals. That portion is subsequently no longer available for level measurement and instead forms interference signals, resulting in a markedly worse signal-to-noise ratio.

In another exemplary embodiment, in the side toward the container, a conical face is provided both between the waveguide and one insert and between that insert and the housing, and with this face the waveguide rests closely against an insert and that insert rests closely against the housing. Once again, a sealing action is attained thereby.

It is a problem in general that all the load-bearing parts must comprise rigid materials, if they are to perform their supporting function. If the level meter is exposed to major temperature changes, then these parts will shrink or expand in accordance with their coefficients of thermal expansion. While an expansion can be well compensated for by the spring construction, sealing problems can occur at low temperatures. Because of the temperature-dictated smaller size of the components, the spring prestressing is less, and tension and compression forces can cause gaps to form between sealing faces that in the normal state rest closely against one another.

SUMMARY OF THE INVENTION

It is the object of the invention to provide a level meter for measuring a level of a product in a container, by means of electromagnetic signals carried into and out of the container along a waveguide, in which especially in the event of major temperature fluctuations at the measurement site and with major pressure or tension forces acting on the waveguide, high tightness is assured.

To that end, the invention comprises a level meter for measuring a level of a product in a container by means of electromagnetic signals, which includes:

at least one waveguide protruding into the container,
which carries the signals into the container and carries signals reflected from a product surface back out, and
which is secured in a housing that can be mounted on the container, and
an elastic molded element, fastened parallel to a longitudinal axis of the waveguide,
which rests sealingly on the housing and the waveguide, and
is adjoined by a recess surrounding the waveguide.

In one feature, the recess extends within the molded element.

In a further feature, the molded element has solely conical or cylindrical jacket faces.

In one feature,
the waveguide is guided into the container through a first insert secured in the housing;
the waveguide has a first conical jacket face, with which it rests on an inside face of the same shape, remote from the container, of the insert;
the waveguide has a second conical jacket face, on which the molded element rests with an inner face of the same shape oriented toward the container; and a second insert is provided, which with a conical jacket face oriented toward the container rests on a jacket face of the same shape, remote from the container, of the molded element;

and the molded element is fastened in place by the first and the second insert.

In a further feature, the recess is defined by the waveguide, the molded element, and the second insert.

In a further feature, the molded element has a region in which a diameter of the molded element changes abruptly.

In a further feature, the molded element is an annular cylinder.

BRIEF DESCRIPTION OF THE INVENTION

The invention and its advantages will now be described in further detail in conjunction with the drawing figures, in which three exemplary embodiments are shown; identical elements are identified by the same reference numerals in the drawings.

DESCRIPTION OF THE PREFERRED EMBODIMENT

Figure 1:
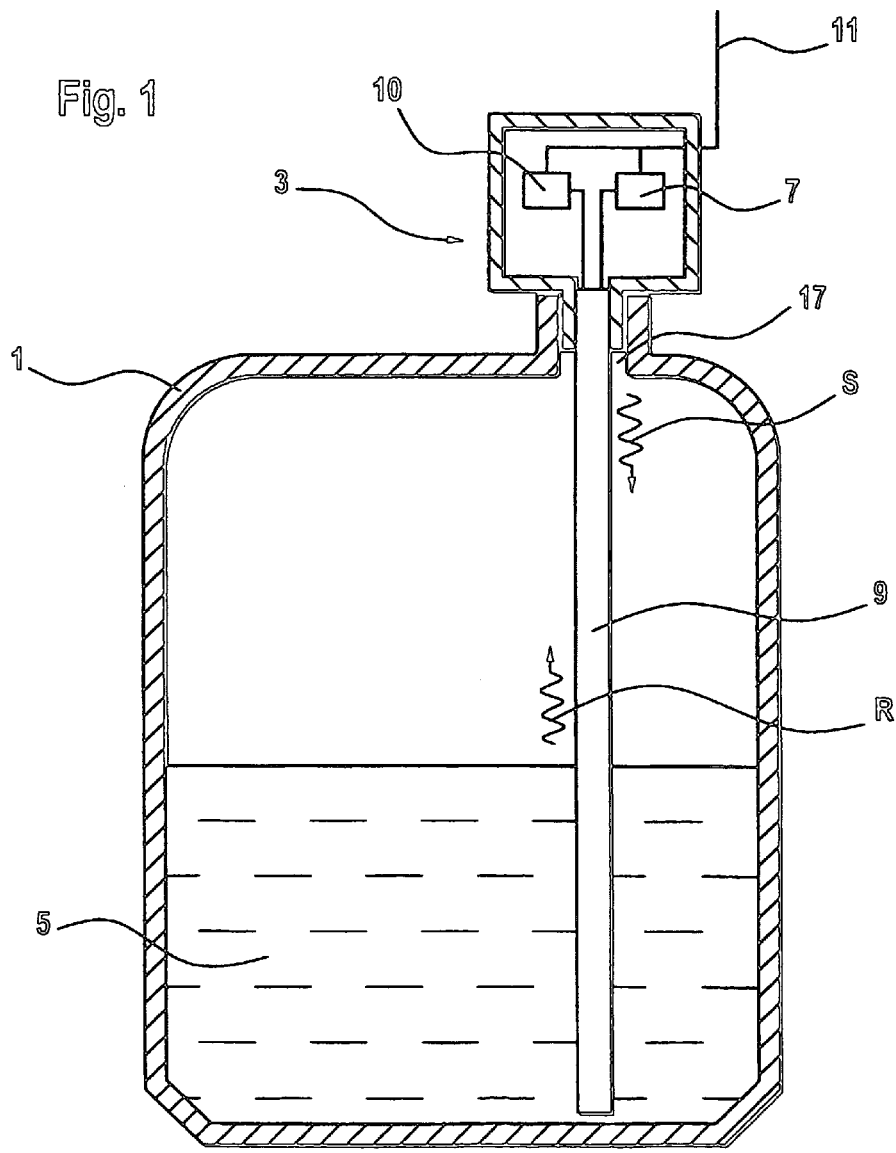
FIG. 1 is a schematic illustration of a level meter disposed on a container.

FIG. 1 shows a schematic illustration of a level meter 3 disposed on a container 1. It is used to measure a level of a product 5 in the container 1 and has an electronic circuit 7 for generating electromagnetic signals S.

The level meter includes a waveguide 9, protruding into the container 1, that carries the signals S into the container 1 and carries signals R reflected from a product surface out again.

The waveguide 9 is for instance a mechanically rigid rod or a mechanically rigid wire. However, a taut cable can equally well be used, one end of which is secured to a bottom of the container 1. Instead of being fastened to the container bottom, a weight can also be secured to the other end, by which the cable is tensed. Both bare rods, wires or cables of metal, such as a special steel, or metal wires, rods or cables provided with an insulation can be used. Polytetrafluorethylene (PTFE), for instance, is suitable as the insulator.

In operation, the reflected signals R are carried to a reception and evaluation circuit 10, which from a transit time of the signals S to the product surface, for instance, and from the signals R reflected back from the product surface determines the fill level in the container 1. The propagation speed of the electromagnetic signals S, R and the distances between the electronic circuit 7 and the container bottom and between the reception and evaluation circuit 10 and the container bottom are either already known or can be obtained by simple reference measurements. With these data, the height of the fill level is obtained from the measured transit time. An outcome of measurement is accessible to further processing, display and/or evaluation via connection lines 11.

Figure 2:
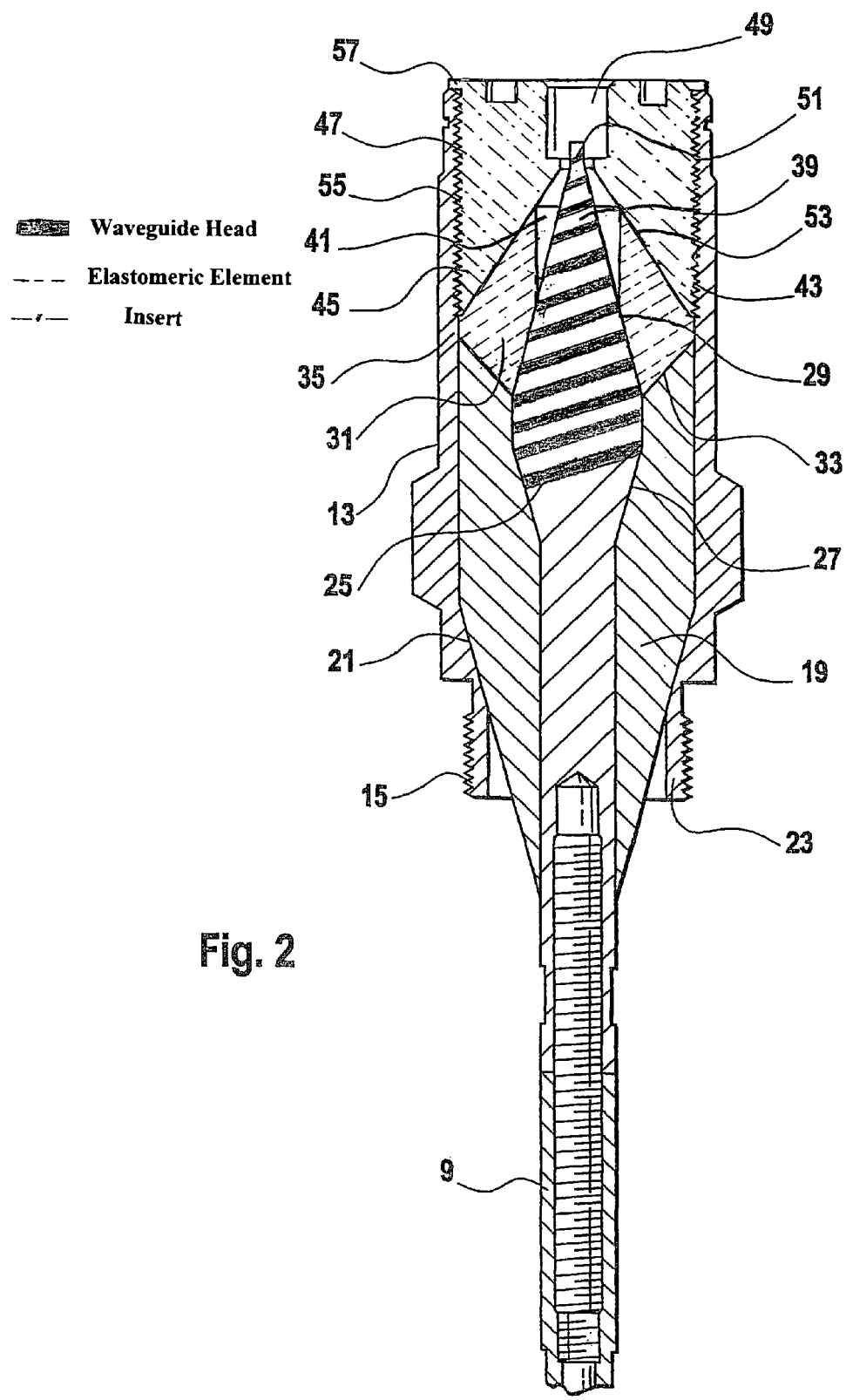
FIG. 2 is a schematic illustration of a level meter in which the recess outside the molded element adjoins the molded element.

The waveguide 9 is secured in a housing 13 that can be mounted on the container 1. The housing 13 comprises an electrically conductive material, such as a metal, and preferably a special steel. FIG. 2 shows a section through the housing 13 and the waveguide 9 secured in it.

The housing 13 essentially has the form of a hollow cylinder. On a lower end of the housing 13, toward the container, a thread 15 is formed onto the outside, by means of which the housing 13 can be screwed into an opening 17 in the container 1.

In the housing 13, there is a first insert 19 comprising a dielectric, through which the waveguide 9 is guided into the container 1. The insert 19 has a conical outer jacket face, toward the container, with which it rests sealingly on a conical inner jacket face 21, of the same shape, of the housing 13. An inside diameter of the housing 13 decreases along the jacket face 21 in the direction toward the container, so that a motion of the first insert 19 in the direction toward the container is prevented. The portion of the housing 13 that has the jacket face 21 is adjoined in the direction toward the container by a cylindrical housing portion 23. In the interior of this housing portion 23, the first insert 19 tapers in the direction toward the container, until it ends at the waveguide 9.

The waveguide 9 has a head 25, disposed in the interior of the housing 13, with a conical first jacket face 27 toward the container, whose diameter decreases in the direction toward the container, and a conical second jacket face 29, remote from the container, whose outside diameter decreases in the direction remote from the container. With the conical jacket face 27 toward the container, the waveguide rests on an inside face of the same shape of the first insert 19 in a sealing manner, so that a motion of the waveguide 9 in the direction toward the container is prevented.

According to the invention, an elastic molded element 31 is provided, fastened parallel to a longitudinal axis L of the waveguide 9 and resting sealingly on the housing 13 of the waveguide 9.

In the exemplary embodiment shown in FIG. 2, the molded element 31 surrounds the waveguide 9 coaxially and has an inside face of the same shape as the second conical jacket face 29 of the waveguide 9, with which inside face it rests on the second conical jacket face 29.

The molded element 31 also has a conical outer jacket face 33, toward the container, with which it rests on an inner jacket face of the same shape of the first insert 19. With a cylindrical outer jacket face 35, the molded element 31 rests on an inner wall of the same shape of the housing 13.

Between a portion 39 of the waveguide 9 remote from the container and tapering in the direction remote from the container, there is a recess 41 adjoining the molded element 31 and surrounding the waveguide 9.

An inside face 43 of the molded element 41, defining the recess 41 in the direction away from the container, is cylindrical, and an outer jacket face 45, remote from the container, of the molded element 41 is conical, and its outside diameter decreases in the direction away from the container.

Thus the molded element 31 has solely conical or cylindrical jacket faces. This offers the advantage that the coaxial cable formed by the waveguide 9, insert 19 and housing 13 has no abrupt changes in impedance in the propagation direction of the electromagnetic signals S, R, where some of the power is reflected and is thus lost for the purposes of fill level measurement. It is even possible to a certain extent to adapt the impedance by means of suitable shaping of the molded element 31.

A second insert 47 is provided in the housing 13; it closes off the housing 13 at the end in the direction away from the container. The second insert 47 is of metal and is cylindrical on the outside. It has a central axial bore 49, into which an extension 51 of the waveguide 9 protrudes. The extension 51 and bore 49 are preferably shaped such that from the side remote from the container, a standard plug, such as a BNC plug, for connecting commercially available coaxial cables can be plugged into the bore 49, in order to connect the waveguide 9, via its extension 51 and the coaxial cable, to the electronic circuit 7. The metal second insert 47 and the electrically conductive housing 13 form an extension of an outer conductor of the coaxial cable.

The second insert 47 has a conical jacket face 53, toward the container, whose inside diameter increases in the direction toward the container, until at the end it is equal to the inside diameter of the housing 13.

The second insert 47 rests, with an outer, rotationally symmetrical portion of this jacket face 53, on the jacket face 45, of the same shape, remote from the container, of the molded element 31.

The molded element 31 is fastened in place by the first and second inserts 19, 47. To that end, the second insert 47, in the exemplary embodiment shown in FIG. 2, has a male thread 55, with which it is screwed into a female thread of the housing 13 in the direction toward the container. On an upper end, away from the container, of the second insert 47, a stop 57 is provided, up to which the insert 47 is meant to be screwed, so that it exerts sufficient pressure on the molded element 31.

The molded element 31 is compressed in the axial direction, parallel to the longitudinal axis L of the waveguide 9, and as a result develops its sealing action in the radial direction, perpendicular to the longitudinal axis L of the waveguide 9. Excess material of the molded element 31 is pressed into the adjacent recess 41 in the process. The recess 41 is defined by the waveguide 9, the molded element 31, and the second insert 47. The recess 41 serves figuratively as an overflow. If at high temperatures the individual components expand because of their coefficients of thermal expansion, then the pressure on the molded element 31 rises, and still more material from the molded element 31 is received in the recess 41. Conversely, if the temperature drops, the process takes place in reverse. Material passes from the recess 41 back again and assures that there is always enough material at adequate pressure for the molded element 31 to develop its sealing action. Additionally, this assures that the components in the interior of the housing 13, which in this case means the waveguide 9 and the first and second inserts 19, 47, are supported without play at all times in the housing 13.

Figure 3:
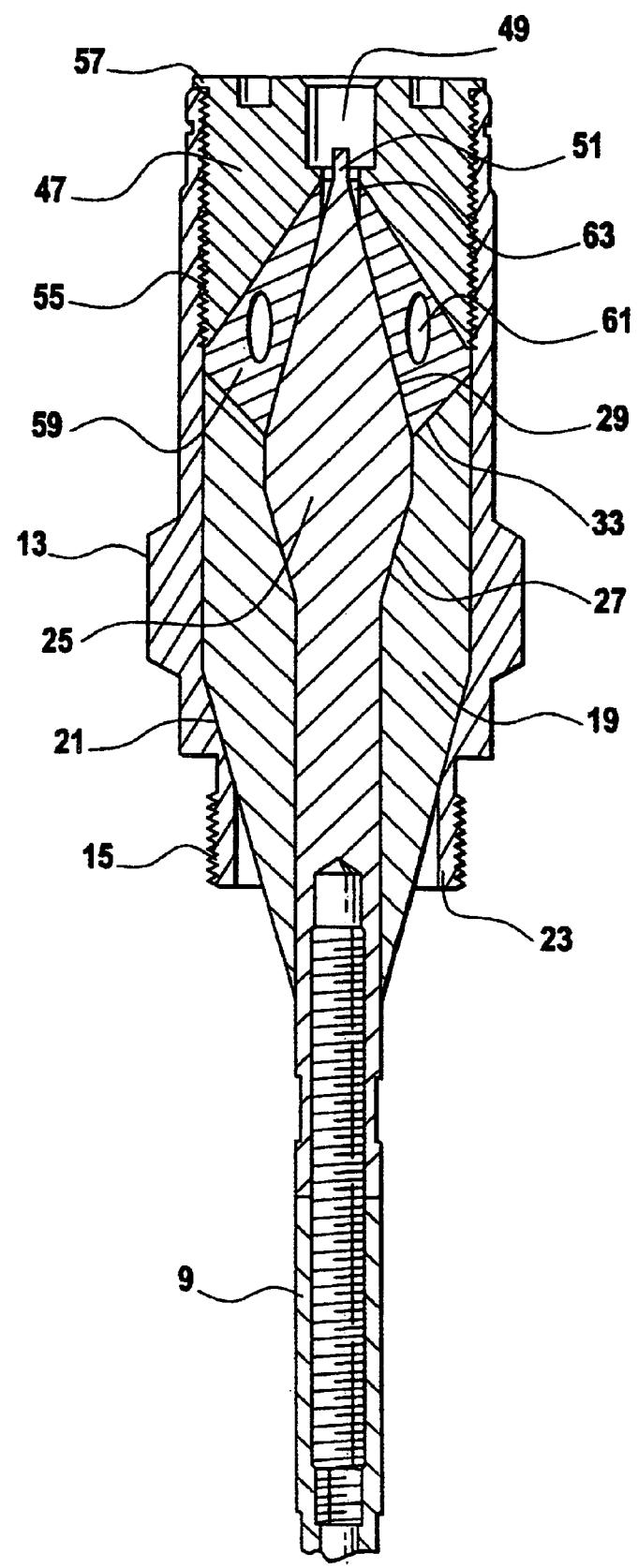
FIG. 3 is a schematic illustration of a level meter in which the recess extends inside the molded element.

FIG. 3 shows a further exemplary embodiment of a level meter of the invention. Because of the extensive agreement with the exemplary embodiment described above, only the differences will be described in detail below.

For instance, in the exemplary embodiment shown in FIG. 3, the level meter has a molded element 59, disposed in the interior of the housing 13, in whose interior an recess 61 of oval cross section extends annularly all the way around. This recess 61 is again suitable for compensating for a thermal expansion of the surrounding components of the level meter and thus of guaranteeing adequate tightness and a play-free disposition of these components, even in the presence of major temperature fluctuations.

Also in the exemplary embodiment shown in FIG. 3, a further recess 63 is provided. It is essentially the same shape as the recess 41 shown in FIG. 2 and is also located at the same place, but is markedly smaller.

The shape and size of the recesses are not limited to the two examples shown in FIGS. 2 and 3. Recesses of completely different shape and size and also a different number of them may be provided. For instance, a plurality of slits may be provided. In designing the recesses, it must merely be assured that the total size of the recesses is enough to compensate for a thermal expansion of the components that surround it and of assuring adequate tightness and a play-free disposition of the components.

Figure 4:
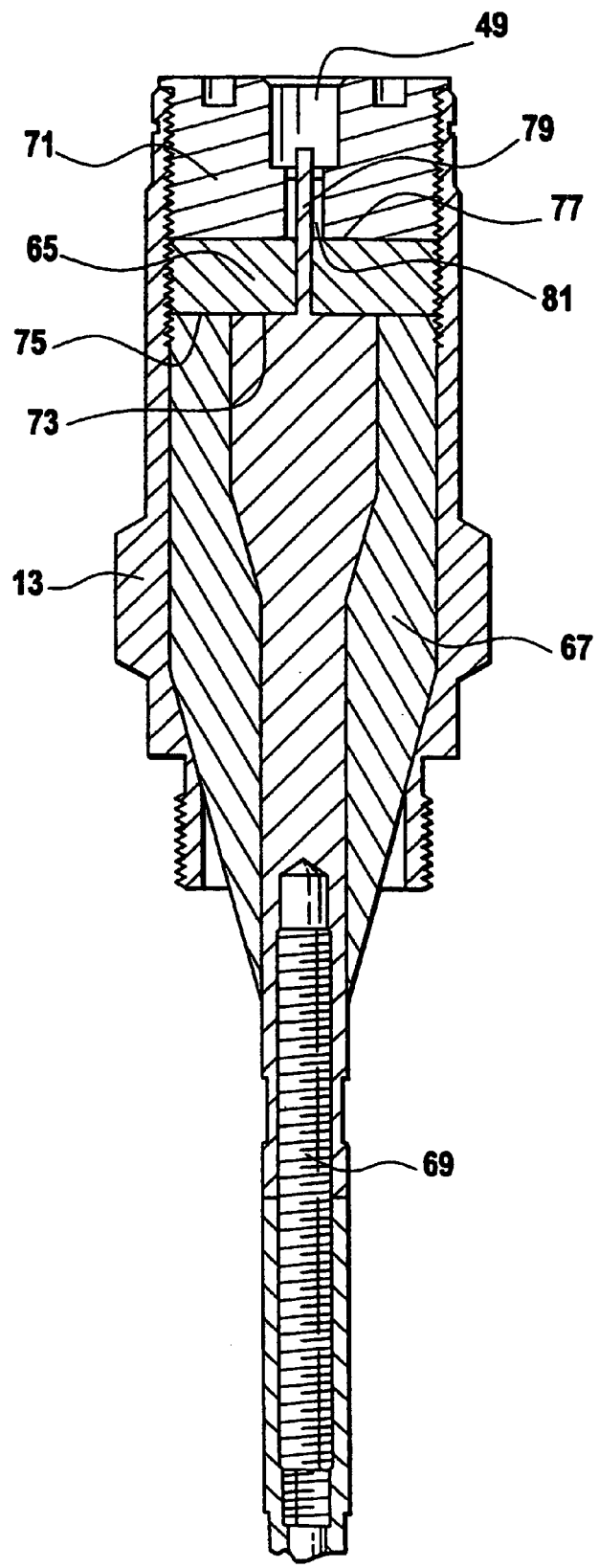
FIG. 4 is a schematic illustration of a level meter in which the molded element has a diameter that changes abruptly.

FIG. 4 shows a further exemplary embodiment. In this level meter, a molded element 65 is provided, which has a region in which a diameter of the molded element 65 changes abruptly. This creates an intentional abrupt change in impedance at the place where in operation a portion of the electromagnetic signals is reflected. This reflected portion or its transit time can serve as a reference time or reference point for the fill level measurement, for instance.

In FIG. 4, an extreme example of this kind of abruptly changing diameter, namely an annular cylinder, is shown.

In this exemplary embodiment as well, just as in the exemplary embodiments described above, a housing 13 is provided, in which a first insert 67 of a dielectric, a waveguide 69, and a second insert 71 of metal are disposed. The first insert 67, the waveguide 69, and the second insert 71 differ from the corresponding components in the previous exemplary embodiments only in that they are adapted in terms of shape to the annular-cylindrical form of the molded element 65. Thus instead of a conical jacket face remote from the container, the waveguide 69 has an annular-disklike face 73, remote from the container, that rests on the molded element 65; the first insert 67, instead of a conical jacket face remote from the container, has an annular-disklike face 75, remote from the container, that rests on the molded element 65; and the second insert 71, instead of a conical jacket face toward the container, has an annular-disklike face 77, toward the container, that rests on the molded element 65.

The second insert 71, in this exemplary embodiment as well, has a central axial bore 49, into which a cylindrical extension 79 of the waveguide 69 that is passed through the molded element 65 protrudes. Via this bore 49 and the extension 79, the electrical connection is made.

Between the extension 79 and the second insert 71, in a region adjoining the molded element 65, there is an annular-cylindrical recess 81, which has the same functions as the recesses described above.

The molded element 31, 59, 65 is all the exemplary embodiments preferably comprises a material with the lowest possible coefficient of thermal expansion, which ideally is even a negative coefficient. Dielectrics and metals, of the kind used for the housing 13, waveguides 9, 69, first insert 19, 67 and second insert 47, 71, have a positive coefficient of thermal expansion. Correspondingly, by using a molded element 31, 59, 65 of a material with the least possible and ideally even negative coefficient of thermal expansion, the recesses 41, 61, 63, 81 can be embodied smaller, since the molded element 31, 59, 65, in the event of rising temperatures, or in other words whenever the recesses 41, 61, 63, 81 act as an overflow, itself has only a slight increase in volume and ideally even a reduced volume.

Fundamentally suitable materials for the molded elements 31, 59, 65 are also, however, elastomers, such as silicone rubber, natural rubber, or elastic foams, such as polyurethane foams. The use of a foam offers the fundamental advantage that foam has pores, which also act as recesses.

The invention claimed is:

1. A level meter for measuring a level of a product in a container by means of electromagnetic signals, comprising:
   a housing;
   an insert located in said housing at an end thereof in the direction away from the container;
   at least one waveguide which extends into the container, said at least one waveguide defining a longitudinal axis, carrying signals into the container toward a product surface in the container, and carrying reflected signals from the product surface back out of the container, said at least one waveguide is secured to said housing mounted on the container; and
   an elastomeric element fastened parallel to said longitudinal axis, said elastomeric element rests sealingly on said housing and said at least one waveguide, and is adjoined by a recess surrounding said at least one waveguide, wherein:
   said recess is defined by said at least one waveguide, said elastomeric element and said insert.

2. The level meter as defined in claim 1, wherein said recess extends within said elastomeric element.

3. The level meter as defined in claim 1, wherein said elastomeric element has one of: solely conical and cylindrical jacket faces.

4. The level meter as defined in claim 1, wherein said elastomeric element has a region in which a diameter of said elastomeric element changes abruptly.

5. The level meter as defined in claim 1, wherein said elastomeric element is an annular cylinder.

6. A level meter for measuring a level of a product in a container by means of electromagnetic signals comprising:
   at least one waveguide which extends into the container, said at least one waveguide defining a longitudinal axis, carrying signals into the container toward a product surface in the container, and carrying reflected signals from the product surface back out of the container, said at least one waveguide is secured to a housing mounted on the container;
   an elastomeric element fastened parallel to said longitudinal axis, said elastomeric element rests sealingly on said housing and said at least one waveguide, and is adjoined by a recess surrounding said at least one waveguide;
   a first insert secured in said housing and defining a conical jacket face; and
   a second insert defining a conical jacket face, wherein:
   said elastomeric element defining a conical jacket face, remote from the container;
   said at least one waveguide has a first conical jacket face which rests against said conical jacket face of said first insert, remote from the container;
   said at least one waveguide has a second conical jacket face on which said elastomeric element rests with an inner face of the same shape oriented toward the container;
   said second insert rests on said conical jacket face of said elastomeric element; and
   said elastomeric element is fastened in place by said first insert and said second insert.

* * * * *